United States Patent
Freund et al.

(10) Patent No.: US 11,030,168 B2
(45) Date of Patent: Jun. 8, 2021

(54) PARALLELIZATION OF ORDER DEPENDENT PROCEDURES DURING SOFTWARE CHANGE PROCESSES

(71) Applicant: SAP SE, Walldorf (DE)

(72) Inventors: Barbara Freund, Heidelberg (DE); Wulf Kruempelmann, Altlussheim (DE)

(73) Assignee: SAP SE, Walldorf (DE)

( * ) Notice: Subject to any disclaimer, the term of this patent is extended or adjusted under 35 U.S.C. 154(b) by 192 days.

(21) Appl. No.: 16/216,387

(22) Filed: Dec. 11, 2018

(65) Prior Publication Data

US 2020/0183902 A1 Jun. 11, 2020

(51) Int. Cl.
| | | |
|---|---|---|
| G06F 17/00 | (2019.01) | |
| G06F 16/21 | (2019.01) | |
| G06F 16/25 | (2019.01) | |
| G06F 16/901 | (2019.01) | |
| G06F 9/50 | (2006.01) | |
| G06F 9/48 | (2006.01) | |

(52) U.S. Cl.
CPC .......... *G06F 16/217* (2019.01); *G06F 9/4881* (2013.01); *G06F 9/5038* (2013.01); *G06F 16/254* (2019.01); *G06F 16/9027* (2019.01)

(58) Field of Classification Search
CPC ........ G06F 16/13; G06F 16/24; G06F 16/156; G06F 16/283; G06N 3/00; G06N 5/00; G05B 13/00
See application file for complete search history.

(56) References Cited

U.S. PATENT DOCUMENTS

| | | | |
|---|---|---|---|
| 7,926,051 B2 | 4/2011 | Barta et al. | |
| 7,950,010 B2 | 5/2011 | Goger et al. | |
| 8,707,283 B2 | 4/2014 | Jung et al. | |
| 8,775,862 B2 | 7/2014 | Rueegg et al. | |
| 9,152,668 B1 | 10/2015 | Moskovitz et al. | |
| 9,367,425 B1 * | 6/2016 | Hale | G06F 3/0481 |
| 9,823,911 B2 * | 11/2017 | Chiba | G06F 8/433 |
| 10,176,217 B1 * | 1/2019 | Dang | G06F 16/182 |
| 2007/0162903 A1 * | 7/2007 | Babb, II | G06F 8/75 |
| | | | 717/154 |
| 2008/0010241 A1 * | 1/2008 | McGoveran | G06F 16/284 |
| 2008/0250405 A1 | 10/2008 | Farhangi et al. | |
| 2010/0257521 A1 | 10/2010 | Navarro | |
| 2013/0158975 A1 * | 6/2013 | Hwang | G06F 40/44 |
| | | | 704/2 |
| 2014/0115012 A1 * | 4/2014 | Das | G06F 16/211 |
| | | | 707/803 |

(Continued)

*Primary Examiner* — Hung D Le
(74) *Attorney, Agent, or Firm* — Mintz Levin Cohn Ferris Glovsky and Popeo, P.C.

(57) ABSTRACT

Described herein includes an information transport system that optimizes the import of information systems to efficiently and speedily complete the transport. The system may include a transport processor for receiving a request to transport data; generating a dependency table comprising a plurality of procedures for executing the request; generating a dependency tree based on the dependency table, the dependency tree comprising at least one independent string of procedures from the plurality of procedures, the dependency tree indicating the order that the plurality of procedures will be executed by the transport processor; and executing the dependency tree.

18 Claims, 8 Drawing Sheets

(56) References Cited

U.S. PATENT DOCUMENTS

2015/0220315 A1* 8/2015 Chiba ................. G06F 8/40
717/149
2018/0285403 A1* 10/2018 Legler ............... G06F 16/2246
2020/0167654 A1* 5/2020 Guo ................... G06N 3/063

* cited by examiner

PARALLELIZATION OF ORDER DEPENDENT PROCEDURES DURING SOFTWARE CHANGE PROCESSES

FIELD

The subject matter described herein relates generally to the import and set-up of information systems and, more specifically to the optimization of parallelizing procedures during the import and set-up of information systems.

BACKGROUND

During information system import or set-up, such as in a cloud computing environment, computing systems may import a large amount of data and may execute a large number of procedures. Often, the procedures form a complex network of dependencies such that the procedures may be dependent on data being calculated or other procedures being first executed. Despite these dependencies, many systems execute procedures without ordering the procedures or taking into account the dependencies between procedures. As a result, systems may execute order-dependent procedures and other procedures in the incorrect order, such that the systems execute order-dependent procedures before the procedures upon which the order-dependent procedures depend. This may lead to constant regeneration of procedures, thereby leading to unreliable or inefficient information system set-up and import that requires an unnecessarily large amount of time and computer processing to complete.

SUMMARY

In some implementations, methods and apparatus, including computer program products, are provided for optimizing the execution of parallelizing procedures during the set-up of information systems that address the unreliability of importing information systems and the large amount of time and computer processing required by current transport systems.

In some implementations, there may be provided a method which may include: receiving, by a transport processor of an application server and via a client interface associated with the application server, a request to transport data. The method may also include generating, at least in part by the transport processor, a dependency table. The dependency table may include a plurality of procedures for executing the request. The method may further include generating, by the transport processor, a dependency tree based on the dependency table. The dependency tree may include at least one independent string of procedures from the plurality of procedures. The dependency tree may indicate the order that the plurality of procedures will be executed by the transport processor. The method may also include executing, by the transport processor, the dependency tree.

In some variations, one or more of the features disclosed herein including the following features can optionally be included in any feasible combination. For example, the executing the dependency tree may further include executing, by the transport processor, each of the one or more independent strings of procedures in parallel.

In other examples, each of the one or more independent strings of procedures includes a root procedure and an order-dependent procedure. The order-dependent procedure may depend on the root procedure being first executed.

In some examples, the executing the dependency tree further includes locating at least two root procedures that do not depend on other procedures being first executed. The executing the dependency tree may also include executing the independent strings of procedures in parallel beginning at each root procedure of the at least two root procedures.

In other examples, generating the dependency table further includes determining, by the transport processor, whether each procedure of the plurality of procedures is a root procedure. The transport processor may determine the root procedure at least in part by determining that the root procedure does not have a predecessor procedure. The predecessor procedure may define a procedure of the plurality of procedures that must be executed prior to a subsequently executed procedure. The generating the dependency table may also include locating the root procedure. The generating the dependency table may further include storing, by the transport processor, the root procedure in the dependency table.

In some examples, generating the dependency table further includes: determining, by the transport processor, whether each procedure of the plurality of procedures is an order-dependent procedure, at least in part by determining that the root procedure depends on a predecessor procedure being first executed. The predecessor procedure may define a procedure of the plurality of procedures that must be executed prior to a subsequently executed procedure. The generating the dependency table may also include locating the order-dependent procedure. The generating the dependency table may also include storing, by the transport processor, the order-dependent procedure in the dependency table.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1A:
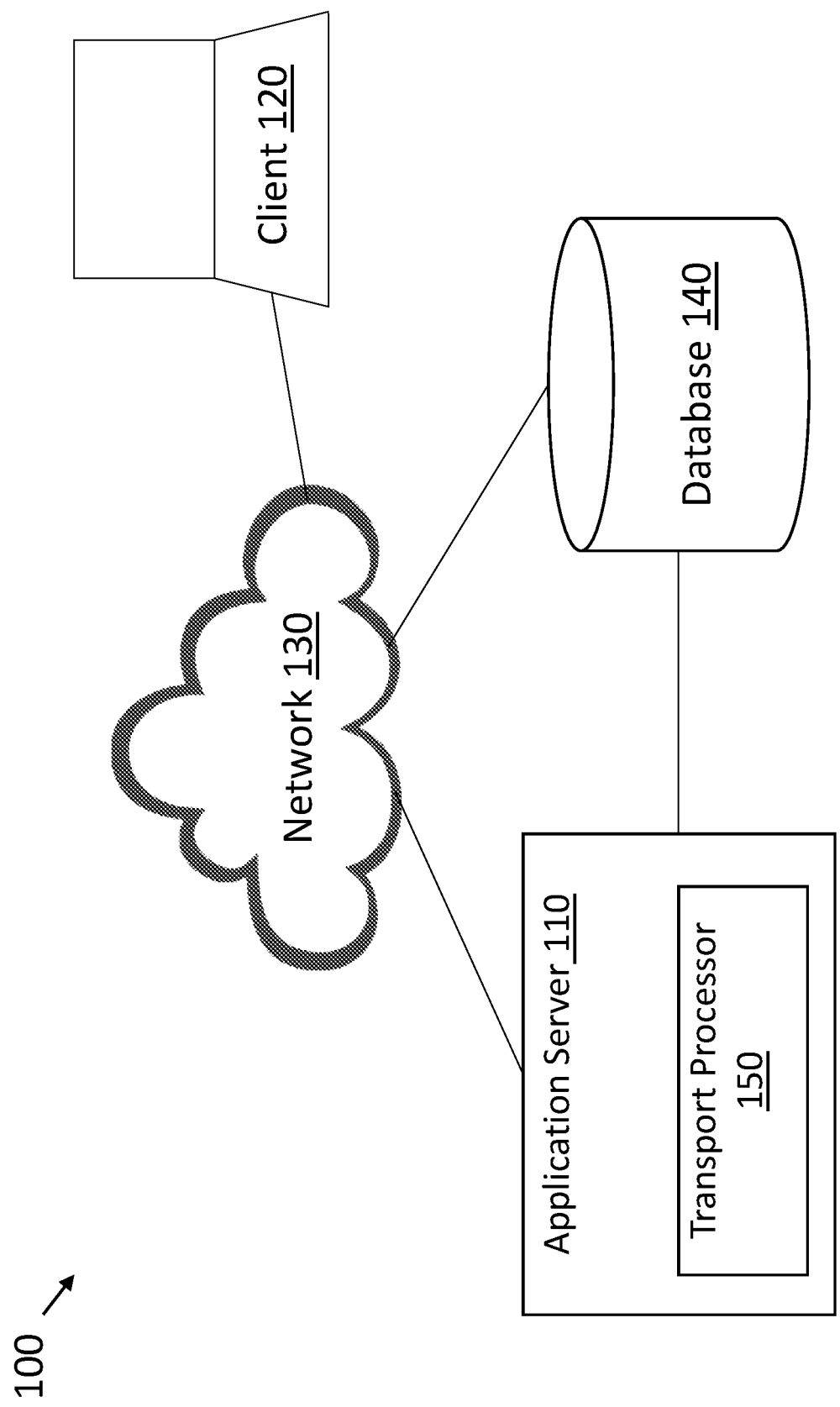
FIG. 1A depicts a system diagram illustrating an information transport system consistent with some implementations of the current subject matter.

This document describes an information transport system for improving integration and the import/set-up of information systems on a network. The information transport system described herein may be particularly helpful while importing a large amount of data and setting up information systems requiring a large number of procedures (e.g., programs, projects, etc.), such as in the enterprise context (e.g., adding stores to a franchise, adding office locations in new locations, etc.). The information transport system may include a transport processor running on an application server of the information transport system that derives an order for executing procedures during information system set-up, and optimizes the execution of those procedures. For example, transport processor may improve the reliability information system set-up and import at least in part by executing independent procedure strings in parallel. Accordingly, the transport system may reduce the amount of time it takes for the information system to be set up (e.g., data imported, procedures executed, etc.), and may reduce the amount of processing power required to set up and import an information system.

Often, importing or setting up an information system (e.g., adding a new store to a franchise, opening a new office location, etc.) to an enterprise network includes the execution of a large number of procedures and calculation of data. When executing the procedures, the information transport system reads data from and/or writes data to one or more data tables stored in one or more databases. However, some of the data tables and/or databases may only be created after the execution of certain procedures. Thus, some procedures are dependent on other order-dependent procedures being executed, such that the procedures would not be able to be executed by the information transport system unless other procedures are first executed.

Despite the complex network of dependencies created during the import/set-up of information systems, many systems are unable to execute the procedures in the proper order. For example, many systems execute the procedures in a randomized order, sequentially, alphabetically, and the like, without taking into account the dependencies. As a result, systems may execute order-dependent procedures and source procedures in the incorrect order. For example, the systems execute order-dependent procedures first, before the source procedures upon which the order-dependent procedures depend, are executed. The execution of procedures in the improper order may lead to constant regeneration of procedures and errors during the import/set-up of information systems, thereby leading to an inefficient and unreliable information system set-up that requires an unnecessarily large amount of time and computer processing to complete.

Moreover, even when systems do execute the procedures for setting up an information system in an appropriate order, a user, such as the user initiating the information system import/set-up may manually determine the entire order of procedure execution, which becomes difficult when importing large systems and data sets. Manually determining and entering the entire order of procedure execution may be difficult in large systems and slows down computer processing. Additionally, the systems may execute all of the procedures sequentially as a single string, further slowing down processing speeds. Certain implementations of the current subject matter may optimize the transport or import of information systems by properly ordering procedures to be executed and by executing independent strings of procedures in parallel.

FIG. 1A depicts a network block diagram illustrating an information transport system 100 consistent with some implementations of the current subject matter. The information transport system 100 may include an application server 110, one or more clients 120, a database 140, and a wired and/or wireless network 130. The application server 110 includes a transport processor 150 that may interact with various features of the transport system 100, such as the one or more clients 120 and the database 140, to derive an order for executing procedures and to optimize execution of the procedures.

During the import/set-up of information systems, the transport processor 150 may read and/or write data calculated and/or stored in one or more data tables. The data tables may be stored in the database 140, which may include a database management system (DBMS) that is coupled with an in-memory database, a relational database, and/or any other types of persistence. The transport processor 150 may use the calculated and/or stored data to generate a dependency table (see, for example, FIG. 2) indicating an order that the procedures of the information system import/set-up will be executed, and to execute the procedures in the order indicated by the dependency table. Deriving an order for executing the procedures, such as by taking into account procedure dependencies, and executing independent strings of programs in parallel in the derived order can help to provide faster and more reliable import/set-up of information systems.

The one or more clients 120 may be any device that includes at least one processor and at least one memory including program code. For example, the client 120 may be a computer, a tablet, a mobile device, a smart phone, and/or a wearable device. The client 120 may be any data collection device configured with network connectivity. In some implementations, the client 120 may receive code or other software from a user via a display screen. For example, the user may send a request to transport a system or import a project via the client 120. The client 120 may receive one or more instructions and/or commands from the user for executing the transport of the system. The client 120 may further receive one or more instructions and/or commands, submitted via the display screen, to request to transport a system or import a project via the client 120. According to some implementations, the transport system 100 may be configured to respond to commands and/or instructions received via the client 120 to request to transport a system or import a project via the client 120, and/or to add to, modify, or remove from the database.

Referring to FIG. 1A, the application server 110 may be communicatively coupled with the one or more clients 120, and/or the database 140 via the wired and/or wireless network 130. The wired and/or wireless network 130 may be a public land mobile network (PLMN), a local area network (LAN), a virtual local area network (VLAN), a wide area network (WAN), a point-to-point link, the Internet, and/or the like.

Figure 1B:
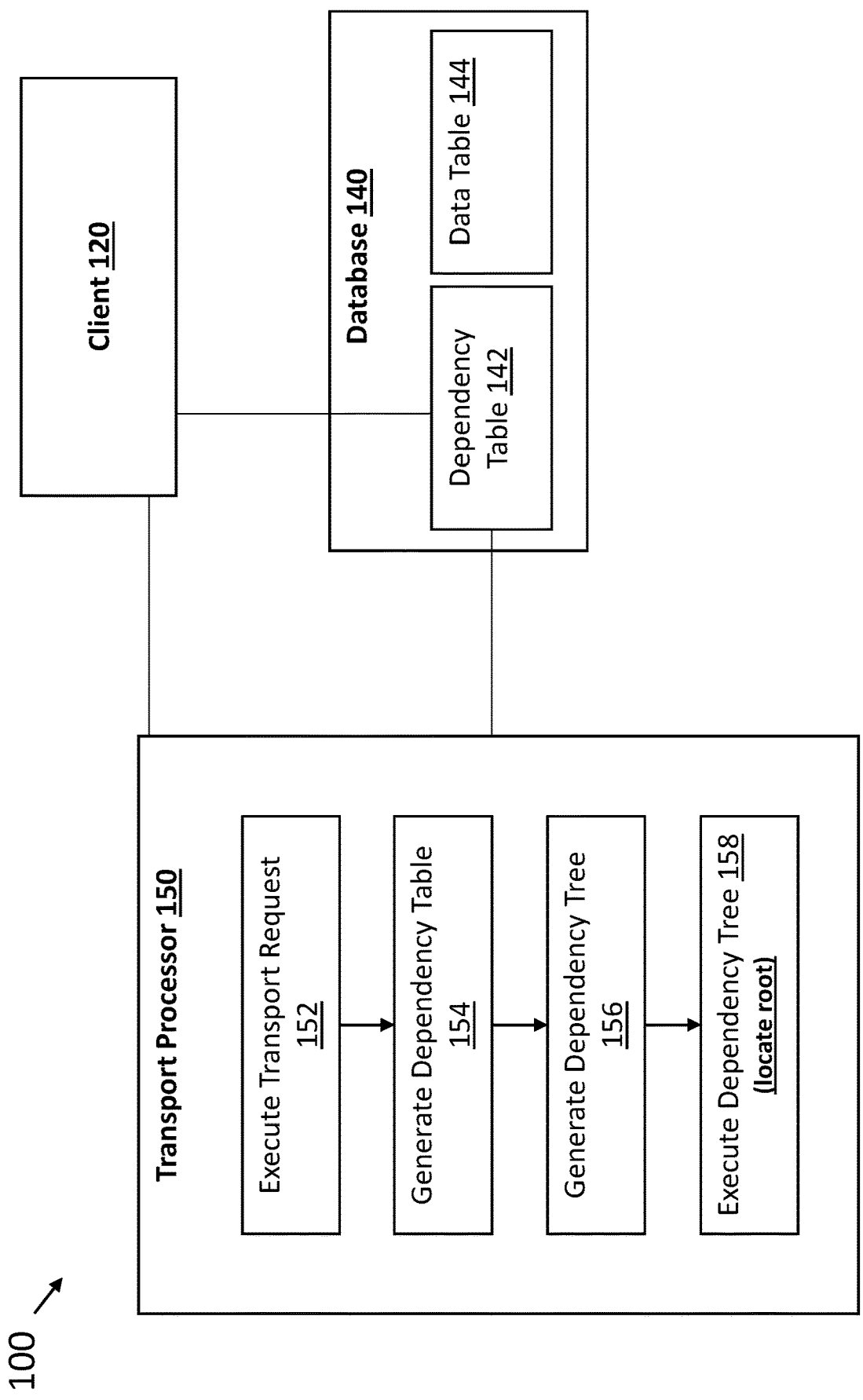
FIG. 1B depicts a detailed system diagram illustrating an information transport system consistent with some implementations of the current subject matter.

FIG. 1B depicts a block diagram illustrating an example of the transport system 100 including the transport processor 150 of the application server 110 consistent with some implementations of the current subject matter. The transport processor 150 may be communicatively coupled with the client 120 and the database 140.

As noted above, the transport processor 150 may receive a request to transport an information system (e.g., import, set-up, etc.), such as via the client 120. At 152, the transport processor 150 executes the request to transport the information system. To execute the request to transport an information system, the transport processor 150 may read and/or write data and store the data in one or more data tables 144 in the database 140.

In some implementations, at 154, the transport processor 150 generates a dependency table 142, which indicates an order that the procedures of the information system transport will be executed. The dependency table 142 may be stored (e.g., temporarily or permanently) in the database 140. As discussed below, the transport processor 150 may generate all or a portion of the dependency table 142, and/or store the dependency table 142 in the database 140. In some situations, the user may generate a portion of the dependency table 142 via the client 120, such as when the dependencies are complex, or may not be easily determined by the transport processor 150. The dependencies may be complex in some circumstances when an order-dependent procedure depends on one or more other procedures, when the dependencies would not be readily apparent, when the dependencies are not able to be determined by the transport processor, etc.

Figure 2:
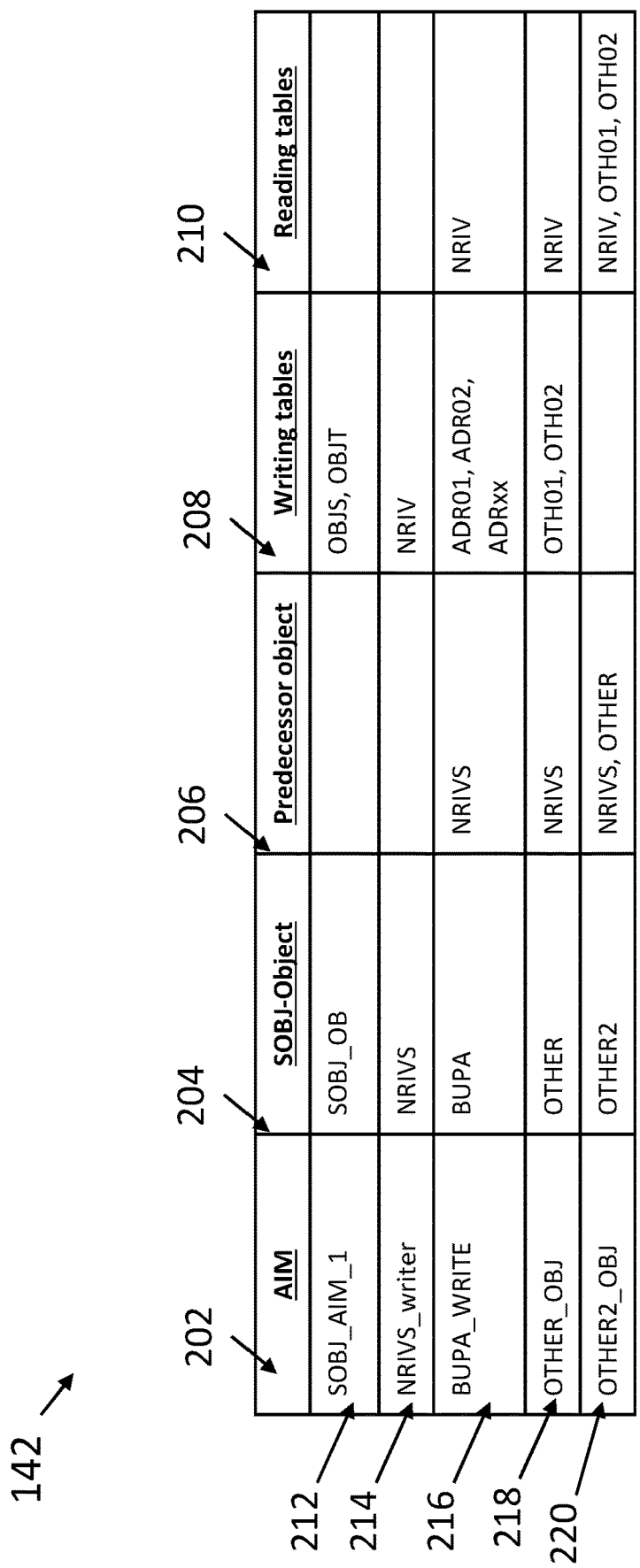
FIG. 2 depicts an example dependency table consistent with some implementations of the current subject matter.

FIG. 2 illustrates an example of the dependency table 142 consistent with implementation of the current subject matter. The dependency table 142 includes one or more columns and fields, which may contain data indicating instructions about the order in which the procedures should be executed during information system transport. The fields of the dependency table 142 represent the procedures to be executed during information system transport and the columns represent one or more aspects of each of the procedures. For example, the columns of the dependency table 142 may include an after input method (AIM) 202, an internal object type 204 (e.g., SOBJ-Object), a predecessor object 206, writing tables 208, and reading tables 210. The AIM 202 indicates a listing of the procedures. The procedures listed in AIM 202 show the procedures that generate tables or table entries to be stored in the database 140 or other procedures/programs to be executed. The internal object type 204 indicates an internal or locally stored data table containing data associated with each procedure.

The writing tables column 208 indicates the data tables the corresponding procedure writes to. The reading tables column 210 indicates the data tables the corresponding procedure reads from. The transport processor 150 may use the information stored in the writing tables column 208 and the reading tables column 210 to determine whether the procedure is a predecessor procedure (e.g., a procedure that is executed before another procedure can be executed), a root procedure (e.g., a procedure that is not dependent on another procedure being first executed), and/or an order-dependent procedure (e.g., a procedure that depends on another procedure being first executed). The transport processor 150 can use the information stored in the writing tables column 208 and the reading tables column 210 to determine which procedures (if any) are the predecessor procedures of each procedure, and to store the predecessor procedures corresponding to each procedure in the predecessor object column 206 of the dependency table 142.

The example dependency table 142 illustrated in FIG. 2 includes a first procedure/AIM 212, a second procedure/AIM 214, a third procedure/AIM 216, a fourth procedure/AIM 218, and a fifth procedure/AIM 220. As shown in the dependency table 142, the first procedure 212 is a root procedure. For example, the first procedure 212 (SOBJ_AIM_1) does not have any predecessor procedures listed in the predecessor object column 206, and does not read from any data tables (though, in some cases, the root procedure may read from only internal data tables). The first procedure 212 also writes to tables OBJIS, OBJIT.

The second procedure 214 (NRIVS_writer) shown in the example dependency table 142 of FIG. 2 is also a root procedure as the second procedure 214 does not have any predecessor procedures listed in the predecessor object column 206, and does not read from any data tables. The second procedure 214 has an internal object type NRIVS (e.g., number range intervals) and writes to tables NRIV (e.g., number range interval).

The third procedure 216 (BUPA_WRITE) shown in the example dependency table 142 of FIG. 2 is an order-dependent procedure. For example, the third procedure 216 has a predecessor procedure listed in the predecessor object column 206 (e.g., NRIVS) and reads from a data table (NRIV) shown in the reading tables column 210. Thus, as shown, the third procedure 216 is dependent on another procedure being first executed, as BUPA_WRITE 216 depends on NRIVS_writer 214 being executed before BUPA_WRITE 216. As noted in the dependency table 142, when NRIVS_writer 214 is executed, NRVS_writer 214 writes to table NRIV. When BUPA_WRITE 216 is executed, BUPA_WRITE reads from table NRIV, which was written by the previously executed NRVS_writer 214.

The fourth procedure 218 (OTHER_OBJ) shown in the example dependency table 142 of FIG. 2 is an order-dependent procedure. For example, the fourth procedure 218 has a predecessor procedure listed in the predecessor object column 206 (e.g., NRIVS) and reads from a data table (NRIV) shown in the reading tables column 210. Thus, as shown, the fourth procedure 218 is dependent on another procedure being first executed, as OTHER_OBJ 218 depends on NRIVS_writer 214 being executed before OTHER_OBJ 218. As noted in the dependency table 142, when NRIVS_writer 214 is executed, NRVS_writer 214 writes to table NRIV. When OTHER_OBJ 218 is executed, OTHER_OBJ 218 reads from table NRIV, which was written by the previously executed NRVS_writer 214.

The fifth procedure 220 (OTHER2_OBJ) shown in the example dependency table 142 of FIG. 2 is another order-dependent procedure. For example, the fifth procedure 220 has two predecessor procedures listed in the predecessor object column 206 (e.g., NRIVS, OTHER) and reads from a data tables (NRIV, OTH01, OTH02) shown in the reading tables column 210. Thus, as shown, the fifth procedure 220 is dependent two other procedures being first executed, as OTHER2_OBJ 220 depends on both NRIVS_writer 214 and OTHER_OBJ 218 being executed before OTHER2_OBJ 220. As noted in the dependency table 142, when NRIVS_writer 214 is executed, NRVS_writer 214 writes to table NRIV and when OTHER_OBJ 218 is executed, OTHER_OBJ 218 writes to tables OTH01 and OTH02. When OTHER2_OBJ 220 is executed, OTHER2_OBJ 220 reads from tables NRIV, OTH01, OTH02, each of which were written by previously executed procedures.

Generally, the transport processor 150 generates the dependency table 142 based on the data being imported. In some circumstances, the transport processor 150 generates a portion of the dependency table 142. For example, the transport processor may populate the dependency table 142 for only some of the procedures. In some circumstances, such as when a procedure is dependent on multiple other procedures or when the transport processor 150 is unable to determine a dependency, the dependency table 142 for at least one procedure may be populated by a user via the client 120.

Figure 3:
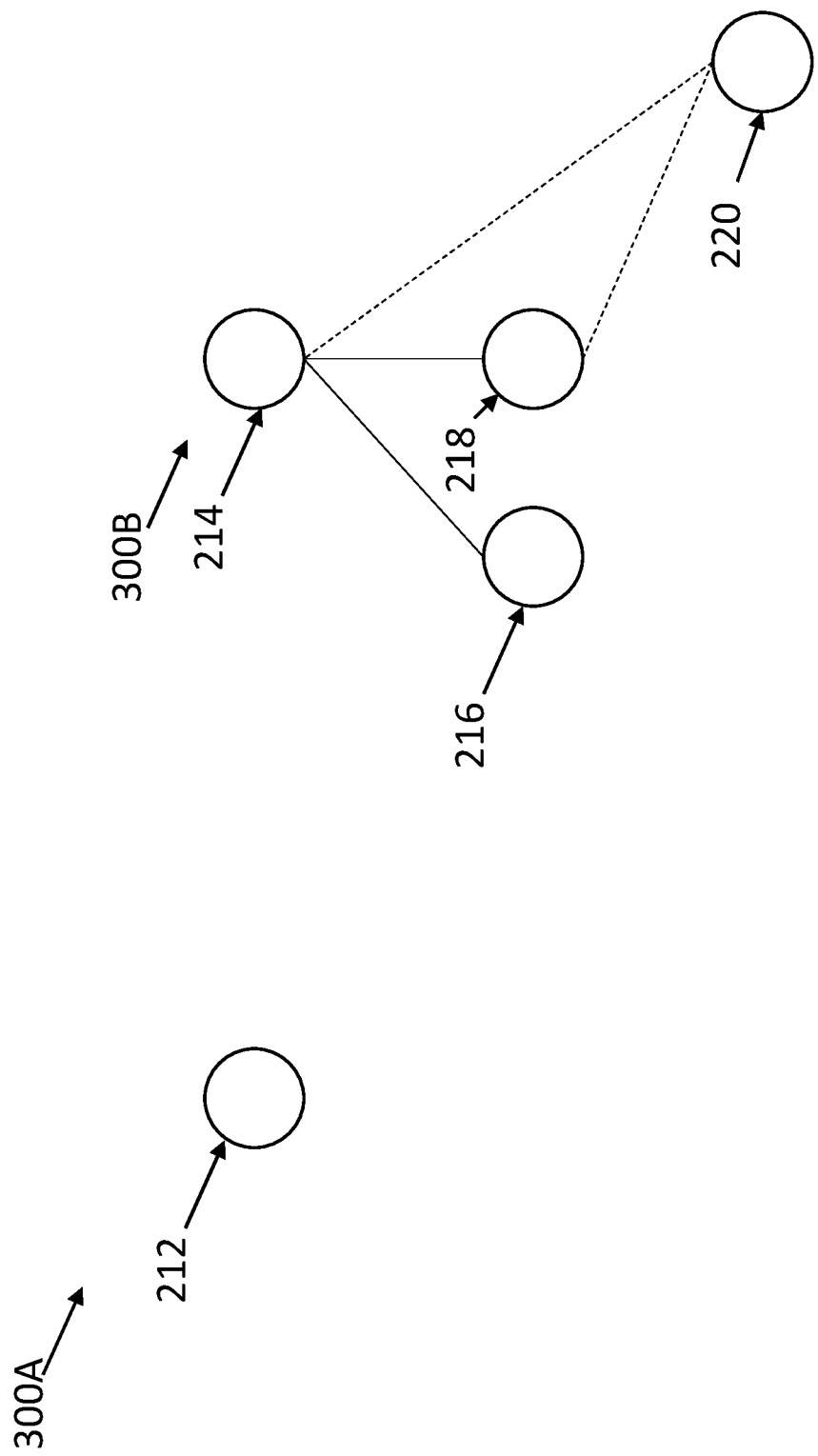
FIG. 3 depicts example dependency trees generated based on the dependency table consistent with some implementations of the current subject matter.

Referring back to FIG. 1B, at 156, the transport processor 150 may generate a dependency tree, based on the dependency table 142, to derive the order that the transport processor 150 will execute the procedures. FIG. 3 illustrates example dependency trees 300A, 300B generated by transport processor based on the dependency table 142. As shown in FIG. 3, the dependency tree 300A includes one procedure. In the context of dependency table 142, the dependency tree 300A includes the first procedure 212, which is a root procedure. In dependency tree 300A, the first procedure 212 represents an independent string of procedures that may be executed by the transport processor 150.

The transport processor 150 may also generate a dependency tree 300B based on the dependency table 142, which helps to ensure that the procedures are executed by the transport processor 150 in the proper order. The dependency tree 300B includes four procedures. For example, the dependency tree 300B includes the second procedure 214, which is a root procedure. The dependency tree 300B shows that the third procedure 216, the fourth procedure 218, and the fifth procedure 220 are order-dependent procedures, which depend on other procedures being previously executed. For example, as discussed above, the third procedure 216 may be executed by the transport processor 150 after the second procedure 214 has been executed by the transport processor 150, the fourth procedure 218 may be executed by the transport processor 150 after the second procedure 214 has been executed by the transport processor 150, and the fifth procedure 220 may be executed by the transport processor 150 after the second procedure 214 and the fourth procedure 218 have both been executed by the transport processor 150.

Once the transport processor 150 generates the dependency trees 300A, 300B, the at 158, the transport processor 150 may execute the request to transport by executing the procedures in the dependency trees 300A, 300B. As noted above, the transport processor 150 may execute independent strings of procedures in parallel to more quickly complete the information system transport.

In some implementations, the transport processor 150 executes each of the dependency trees 300A, 300B in parallel. In some implementations, the transport processor 150 executes independent strings of procedures within each dependency tree in parallel. For example, the transport processor 150 may locate and execute the root procedure in each dependency tree. After the transport processor 150 executes the root procedure, the transport processor 150 may locate and execute each order-dependent procedure in each dependency tree in which all of the predecessor procedures have been executed for each respective order-dependent procedure. In the context of dependency tree 300B, the transport processor 150 may locate and execute the second procedure 214. After the transport processor 150 executes the second procedure 214, the transport processor 150 may execute the third procedure 216 and the fourth procedure 218 in parallel, since all of the predecessor procedures of the third and fourth procedures 216, 218 (e.g., the second procedure 214) have been previously executed by the transport processor 150. After the transport processor 150 executes at least the second and fourth procedures 214, 218, the transport processor may execute the fifth procedure 220.

In some implementations, the transport processor 150 executes a first and second independent string of procedure in parallel to more quickly complete the transport. For example, the transport processor 150 may execute a first independent procedure string (e.g., second procedure 214—third procedure 216) and a second independent procedure string (e.g., second procedure 214—fourth procedure 218—fifth procedure 220) in parallel. Accordingly, the transport processor 150 may optimize completing a transport of an information system by parallelizing the execution of procedures during the transport.

Figure 4:
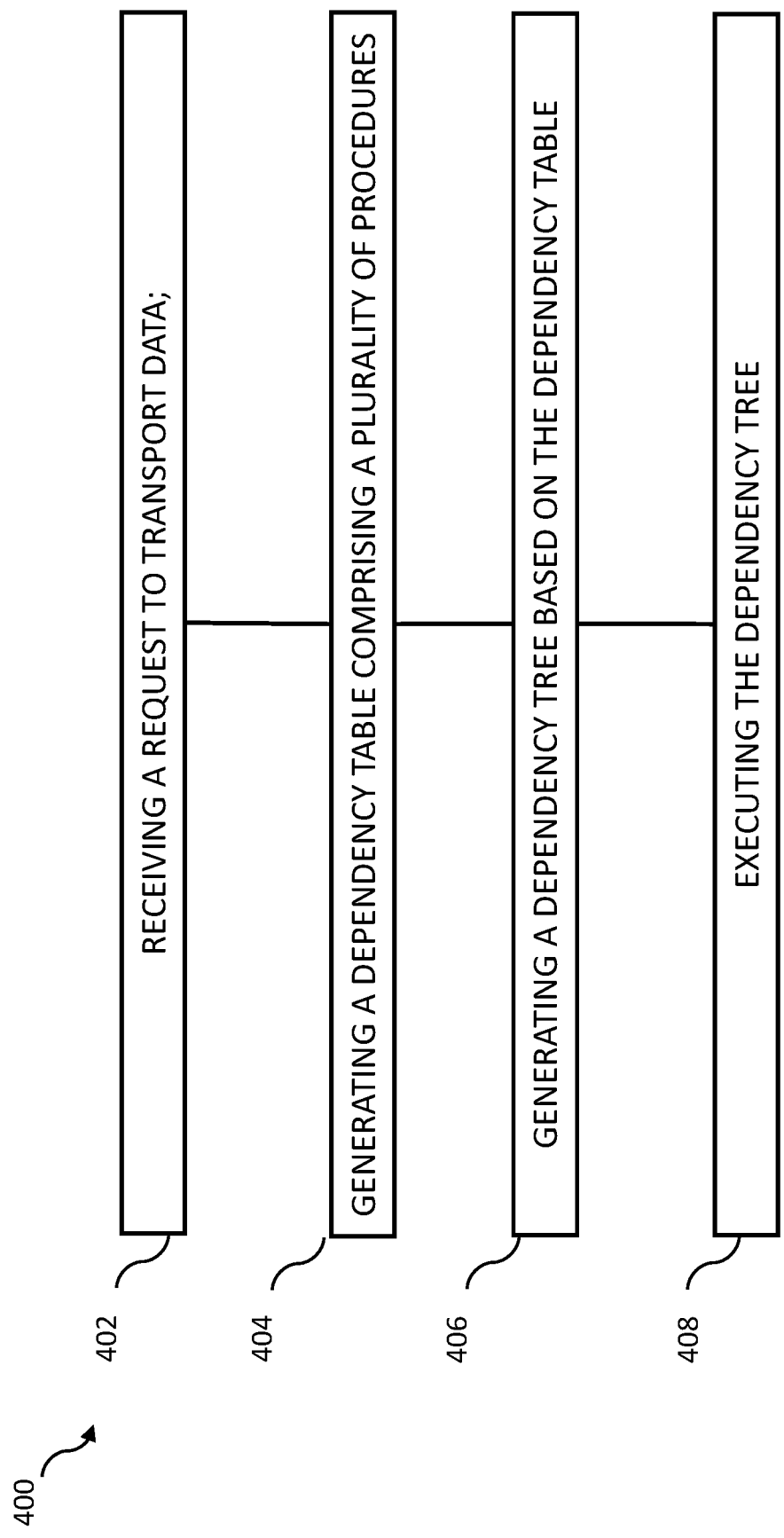
FIG. 4 depicts a flowchart illustrating a process for optimizing information system transport consistent with some implementations of the current subject matter.

FIG. 4 shows a process flow chart 400 illustrating features of a process consistent with one or more implementations of the current subject matter.

At 402, the transport processor 150 of the application server 110 may receive a request to transport (e.g., import) data (e.g., data tables, an information system including procedures and data tables, etc.). The request to transport data may be received by the transport processor 150 via a client interface 120 associated with and/or in communication with the application server 110. The request to transport data may include instructions (e.g., a text string, command, etc.) to transport the data. In some implementations, the request to transport data may include one or more procedures that will be executed by the transport processor 150 during the transport of data. In some implementations, the request to transport data may include one or more dependencies between the one or more procedures, that are received by the transport processor 150, via the client interface 120. The one or more dependencies may be stored in the dependency table 142, such as in the database 140.

At 404, the transport processor 150 generates at least a part of the dependency table 150. As mentioned above, the dependency table, such as dependency table 142, includes one or more procedures. The dependency table 142 may provide a visual representation of the dependencies between procedures. As described above, the dependency table 142 may indicate whether each procedure has a predecessor procedure, which (if any) tables each procedure reads from, and which (if any) tables each procedure writes to when executed. The dependency table 142 may be stored locally or in a remote database, such as in database 140.

Figure 5:
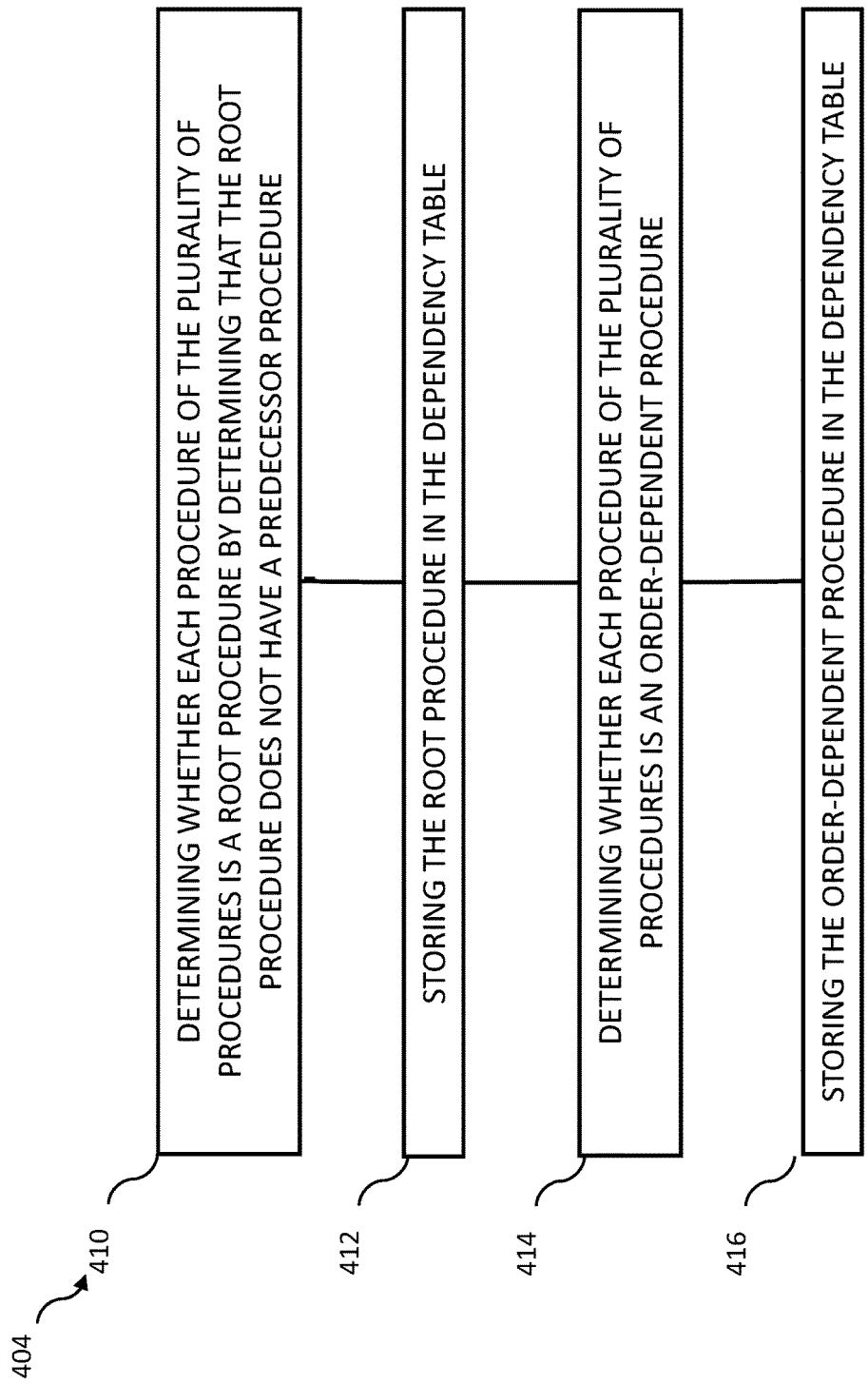
FIG. 5 depicts a flowchart illustrating a process for generating a dependency table consistent with implementations of the current subject matter.

FIG. 5 shows a process flow 404 consistent with one or more implementations of the current subject matter, for generating the dependency table. At 410, the transport processor 150 may determine whether each procedure of the one or more procedures is a root procedure. To determine whether each procedure is a root procedure, the transport processor may determine that a particular procedure does not have a predecessor procedure, which defines a procedure of the one or more procedures that must be executed by the transport processor 150 prior to a subsequently executed procedure. In some implementations, the root procedure is a procedure that does not read data written in the database 140 by another procedure (e.g., the root procedure in some cases may read data only from a local data table).

At 412, the transport processor 150 stores the root procedure in the dependency table 142 (along with any dependencies). For example, the transport processor 150 may indicate that a procedure in the dependency table does not have any predecessor procedures or that the procedure in the dependency table does not read from any data tables stored in the database 140. The transport processor 150 may also indicate in the dependency table 142 which data tables in the database 140 the root procedure writes to.

At 414, the transport processor 150 may determine whether each procedure of the one or more procedures (e.g., remaining procedures) is an order-dependent procedure. To determine whether each procedure is an order-dependent procedure, the transport processor 150 may determine that a particular procedure has a predecessor procedure. In some implementations, the transport processor 150 determines that a particular procedure is an order-dependent procedure by determining that the particular procedure reads from one or more data tables stored in the database 140 that are written during the execution of one or more other procedures.

At 416, the transport processor 150 stores the order-dependent procedure in the dependency table 142 (along with any dependencies). For example, the transport processor 150 may indicate that a procedure in the dependency table has one or more predecessor procedures and list which procedures are the one or more predecessor procedures or may indicate that the procedure in the dependency table reads from one or more data tables stored in the database 140 and list which data tables are read from. The transport processor 150 may also indicate in the dependency table 142 which data tables in the database 140 the root procedure writes to or reads from.

Referring to FIG. 4, at 406, after the transport processor 150 generates (at least in part) the dependency table 142, the transport processor 150 generates at least one dependency tree, such as the dependency trees shown in FIG. 3, based on the dependency table 142. The dependency tree may indicate the order that the transport processor 150 will execute the one or more procedures of the information system transport. Each dependency tree may include one or more independent strings of procedures that may be executed by the transport processor 150.

Figure 6:
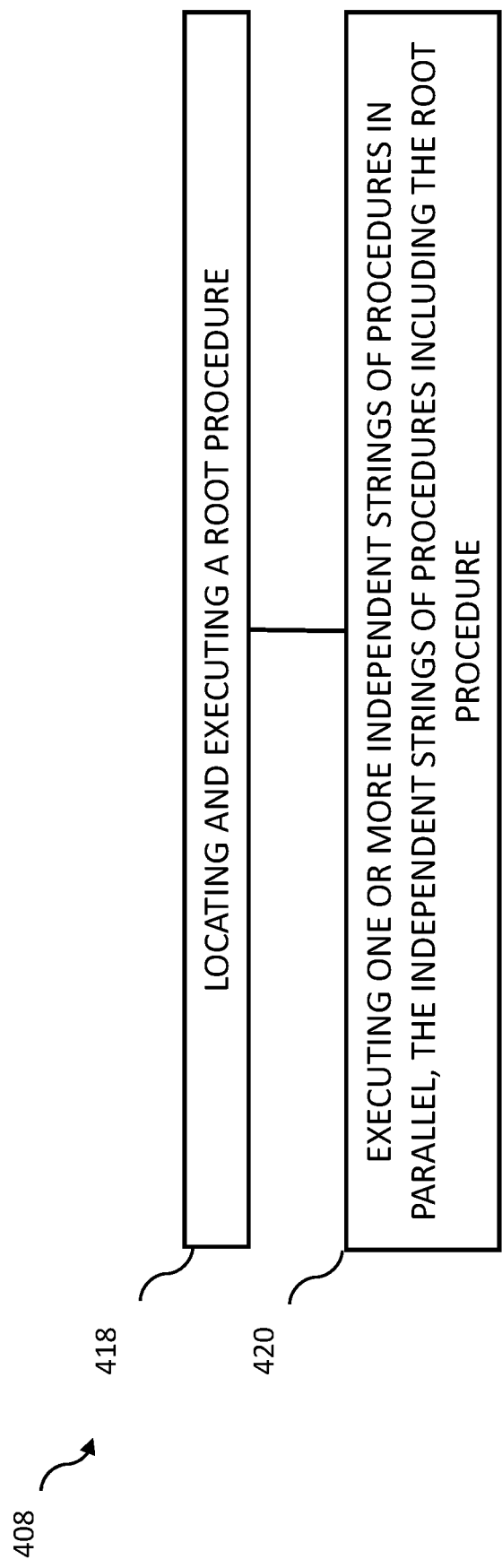
FIG. 6 depicts a flowchart illustrating a second process for executing an information system transport consistent with some implementations of the current subject matter.

At 408, the transport processor 150 may execute the dependency tree. FIG. 6 shows a process flow 406 consistent with one or more implementations of the current subject matter, for executing the dependency tree. As noted above with respect to FIGS. 1-3, at 418, the transport processor 150 may locate and execute at least one root procedure (e.g., a procedure that does not have a predecessor procedure). In some implementations, the transport processor 150 locates and executes all or at least some of the root procedures in parallel.

At 420, the transport processor locates and executes (e.g., recursively) each order-dependent procedure in which the transport processor 150 has executed all of the predecessor procedures of each respective order-dependent procedure, such as in parallel. In some implementations, at 420, the transport processor 150 executes each independent string of procedures in parallel to reduce transport-processing speed. For example, as noted above, each independent string of procedures may include a root procedure and an order-dependent procedure. In some implementations, each independent string of procedures may include a root procedure and two or more order-dependent procedures. Parallelizing the execution of each independent string of procedures may help to reduce the amount of time to transport an information system.

Figure 7:
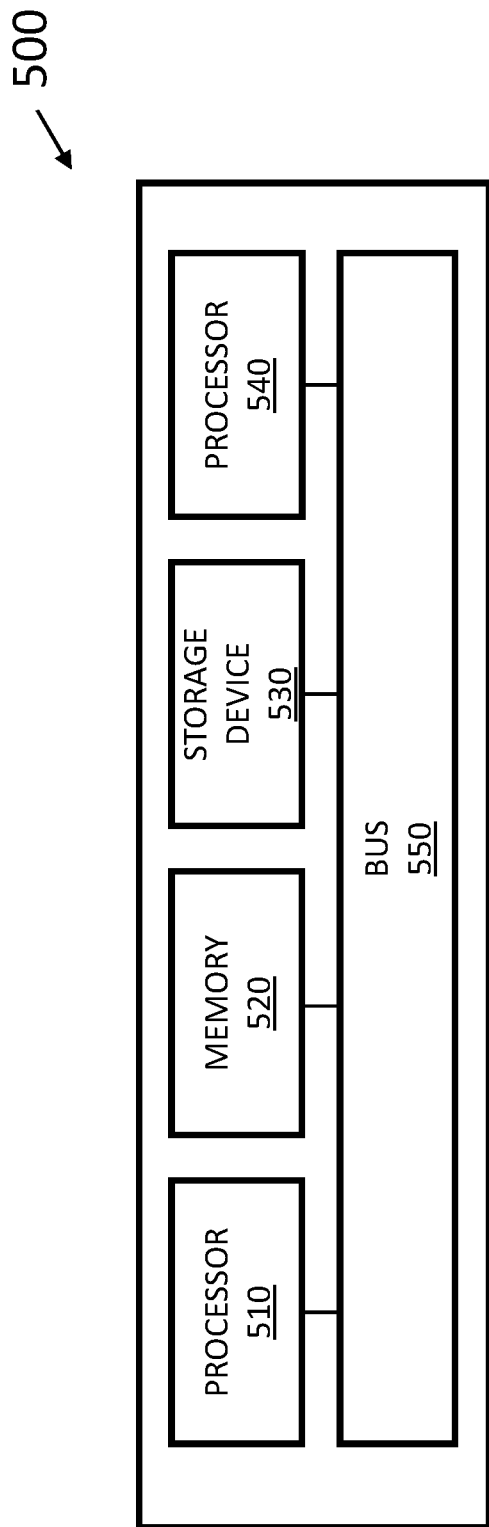
FIG. 7 depicts a block diagram illustrating a computing system consistent with some implementations of the current subject matter.

FIG. 7 depicts a block diagram illustrating a computing system 500 consistent with implementations of the current subject matter. Referring to FIGS. 1 and 7, the computing system 500 may be used to information transport system 100 and/or any components therein.

As shown in FIG. 7, the computing system 500 may include a processor 510, a memory 520, a storage device 530, and input/output devices 540. The processor 510, the memory 520, the storage device 530, and the input/output devices 540 may be interconnected via a system bus 550. The processor 510 is capable of processing instructions for execution within the computing system 500. The executed instructions may implement one or more components of, for example, information transport system 100. In some implementations of the current subject matter, the processor 510 may be a single-threaded processor. Alternately, the processor 510 may be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 may store data structures representing configuration object databases, for example. The storage device 530 is capable of providing persistent storage for the computing system 500. The storage device 530 may be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

Consistent with some implementations of the current subject matter, the input/output device 540 may provide input/output operations for a network device. For example, the input/output device 540 may include Ethernet ports or other networking ports to communicate with one or more wired and/or wireless networks (e.g., a local area network (LAN), a wide area network (WAN), the Internet).

In some implementations of the current subject matter, the computing system 500 may be used to execute various interactive computer software applications that may be used for organization, analysis and/or storage of data in various formats. Alternatively, the computing system 500 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities (e.g., SAP Integrated Business Planning as an add-in for a spreadsheet and/or other type of program) or may be standalone computing products and/or functionalities. Upon activation within the applications, the functionalities may be used to generate the user interface provided via the input/output device 540. The user interface may be generated and presented to a user by the computing system 500 (e.g., on a computer screen monitor, etc.).

One or more aspects or features of the subject matter described herein may be realized in digital electronic circuitry, integrated circuitry, specially designed ASICs, field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store the machine instructions non-transitorily, such as for example as would a non-transient solid-state memory or a magnetic hard drive or any equivalent storage medium. The machine-readable medium may alternatively or additionally store the machine instructions in a transient manner, such as for example, as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, the phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
   receiving, by a transport processor of an application server and via a client interface associated with the application server, a request to transport data;
   generating, at least in part by the transport processor, a dependency table comprising a plurality of procedures for executing the request;
   generating, by the transport processor, a dependency tree based on the dependency table, the dependency tree comprising at least one independent string of procedures from the plurality of procedures, the dependency tree indicating the order that the plurality of procedures will be executed by the transport processor; and
   executing, by the transport processor, the dependency tree.

2. The system of claim 1, wherein the executing the dependency tree further comprises executing, by the transport processor, each of the one or more independent strings of procedures in parallel.

3. The system of claim 2, wherein each of the one or more independent strings of procedures includes a root procedure and an order-dependent procedure, the order-dependent procedure depending on the root procedure being first executed.

4. The system of claim 1, wherein the executing the dependency tree further comprises locating at least two root procedures that do not depend on other procedures being first executed, and executing the independent strings of procedures in parallel beginning at each root procedure of the at least two root procedures.

5. The system of claim 1, wherein generating the dependency table further comprises:
   determining, by the transport processor, whether each procedure of the plurality of procedures is a root procedure, at least in part by determining that the root procedure does not have a predecessor procedure, the predecessor procedure defining a procedure of the plurality of procedures that must be executed prior to a subsequently executed procedure;

locating the root procedure; and storing, by the transport processor, the root procedure in the dependency table.

6. The system of claim 1, wherein generating the dependency table further comprises:

determining, by the transport processor, whether each procedure of the plurality of procedures is an order-dependent procedure, at least in part by determining that the root procedure depends on a predecessor procedure being first executed, the predecessor procedure defining a procedure of the plurality of procedures that must be executed prior to a subsequently executed procedure;

locating the order-dependent procedure; and storing, by the transport processor, the order-dependent procedure in the dependency table.

7. A computer-implemented method, comprising:

receiving, by a transport processor of an application server and via a client interface associated with the application server, a request to transport data;

generating, at least in part by the transport processor, a dependency table comprising a plurality of procedures for executing the request;

generating, by the transport processor, a dependency tree based on the dependency table, the dependency tree comprising at least one independent string of procedures from the plurality of procedures, the dependency tree indicating the order that the plurality of procedures will be executed by the transport processor; and executing, by the transport processor, the dependency tree.

8. The method of claim 7, wherein the executing the dependency tree further comprises executing, by the transport processor, each of the one or more independent strings of procedures in parallel.

9. The method of claim 8, wherein each of the one or more independent strings of procedures includes a root procedure and an order-dependent procedure, the order-dependent procedure depending on the root procedure being first executed.

10. The method of claim 7, wherein the executing the dependency tree further comprises locating at least two root procedures that do not depend on other procedures being first executed, and executing the independent strings of procedures in parallel beginning at each root procedure of the at least two root procedures.

11. The method of claim 7, wherein generating the dependency table further comprises:

determining, by the transport processor, whether each procedure of the plurality of procedures is a root procedure, at least in part by determining that the root procedure does not have a predecessor procedure, the predecessor procedure defining a procedure of the plurality of procedures that must be executed prior to a subsequently executed procedure; locating the root procedure; and storing, by the transport processor, the root procedure in the dependency table.

12. The method of claim 7, wherein generating the dependency table further comprises:

determining, by the transport processor, whether each procedure of the plurality of procedures is an order-dependent procedure, at least in part by determining that the root procedure depends on a predecessor procedure being first executed, the predecessor procedure defining a procedure of the plurality of procedures that must be executed prior to a subsequently executed procedure;

locating the order-dependent procedure; and storing, by the transport processor, the order-dependent procedure in the dependency table.

13. A non-transitory computer-readable medium storing instructions, which when executed by at least one data processor, result in operations comprising:

receiving, by a transport processor of an application server and via a client interface associated with the application server, a request to transport data;

generating, at least in part by the transport processor, a dependency table comprising a plurality of procedures for executing the request;

generating, by the transport processor, a dependency tree based on the dependency table, the dependency tree comprising at least one independent string of procedures from the plurality of procedures, the dependency tree indicating the order that the plurality of procedures will be executed by the transport processor; and executing, by the transport processor, the dependency tree.

14. The non-transitory computer-readable medium of claim 13, wherein the executing the dependency tree further comprises executing, by the transport processor, each of the one or more independent strings of procedures in parallel.

15. The non-transitory computer-readable medium of claim 14, wherein each of the one or more independent strings of procedures includes a root procedure and an order-dependent procedure, the order-dependent procedure depending on the root procedure being first executed.

16. The non-transitory computer-readable medium of claim 13, wherein the executing the dependency tree further comprises locating at least two root procedures that do not depend on other procedures being first executed, and executing the independent strings of procedures in parallel beginning at each root procedure of the at least two root procedures.

17. The non-transitory computer-readable medium of claim 13, wherein generating the dependency table further comprises:

determining, by the transport processor, whether each procedure of the plurality of procedures is a root procedure, at least in part by determining that the root procedure does not have a predecessor procedure, the predecessor procedure defining a procedure of the plurality of procedures that must be executed prior to a subsequently executed procedure;

locating the root procedure; and storing, by the transport processor, the root procedure in the dependency table.

18. The non-transitory computer-readable medium of claim 13, wherein generating the dependency table further comprises:

determining, by the transport processor, whether each procedure of the plurality of procedures is an order-dependent procedure, at least in part by determining that the root procedure depends on a predecessor procedure being first executed, the predecessor procedure defining a procedure of the plurality of procedures that must be executed prior to a subsequently executed procedure;

locating the order-dependent procedure, and storing, by the transport processor, the order-dependent procedure in the dependency table.

* * * * *